United States Patent
Liu et al.

(10) Patent No.: US 12,444,091 B2
(45) Date of Patent: Oct. 14, 2025

(54) TEXTURE COORDINATE PREDICTION IN MESH COMPRESSION

(71) Applicant: Tencent America LLC, Palo Alto, CA (US)

(72) Inventors: Shan Liu, San Jose, CA (US); Jun Tian, Belle Mead, NJ (US); Xiaozhong Xu, State College, PA (US); Chao Huang, Palo Alto, CA (US); Xiang Zhang, Sunnyvale, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 312 days.

(21) Appl. No.: 18/345,027

(22) Filed: Jun. 30, 2023

(65) Prior Publication Data

US 2024/0078713 A1     Mar. 7, 2024

Related U.S. Application Data (60) Provisional application No. 63/404,399, filed on Sep. 7, 2022.

(51) Int. Cl.
    *G06T 9/00* (2006.01)
(52) U.S. Cl.
    CPC .................. *G06T 9/001* (2013.01)
(58) Field of Classification Search
    None
    See application file for complete search history.

(56) References Cited

U.S. PATENT DOCUMENTS

| | | | | |
|---|---|---|---|---|
| 6,577,310 B1* | 6/2003 | Kim | ............... | G06T 9/001 |
| | | | | 375/E7.084 |
| 6,668,091 B1* | 12/2003 | Kim | ............... | G06T 9/001 |
| | | | | 382/241 |
| 10,977,773 B2* | 4/2021 | Hemmer | ............... | G06T 9/001 |
| 11,069,150 B2* | 7/2021 | Sminchisescu | ............... | G06T 17/20 |
| 11,410,340 B2* | 8/2022 | Lv | ............... | G06T 17/20 |
| 2019/0371080 A1* | 12/2019 | Sminchisescu | ............... | G06T 17/20 |
| 2020/0098137 A1* | 3/2020 | Hemmer | ............... | G06T 9/001 |

(Continued)

OTHER PUBLICATIONS

Jarek Rossignac et al., "3D Compression Made Simple: Edgebreaker on a Corner-Table", 2001, 7 pages.

(Continued)

*Primary Examiner* — Anand P Bhatnagar
(74) *Attorney, Agent, or Firm* — Sughrue Mion, PLLC (57) ABSTRACT

Method, apparatus, and system for texture coordinate prediction for mesh compression are provided. The process may include receiving, for a mesh, a coordinate of a first vertex and a coordinate of a prediction candidate vertex in a three dimensional (3D) space. The process may include determining a stretch perpendicular distance associated with the first vertex and the prediction candidate vertex, the stretch perpendicular distance being based on a conversion of the 3D space into a two dimensional (2D) space, and determining a 2D texture coordinate of the first vertex based on the stretch perpendicular distance associated with the first vertex and the prediction candidate vertex. The process may also include determining a residual of a predicted coordinate of the first vertex and an actual 2D coordinate of the first vertex; and compressing the mesh based on entropy coding the residual.

20 Claims, 8 Drawing Sheets

(56) References Cited

U.S. PATENT DOCUMENTS

| | | | | |
|---|---|---|---|---|
| 2020/0265552 A1* | 8/2020 | Hemmer | ............... | G06T 17/205 |
| 2021/0090301 A1* | 3/2021 | Mammou | .............. | H04N 19/20 |
| 2021/0183111 A1* | 6/2021 | Lv | ........................ | G06T 17/005 |
| 2021/0358197 A1* | 11/2021 | Shysheya | .............. | G06T 11/001 |

OTHER PUBLICATIONS

International Search Report dated Oct. 13, 2023 in Application No. PCT/US23/26898.
Written Opinion of the International Searching Authority dated Oct. 13, 2023 in Application No. PCT/US23/26898.

* cited by examiner

TEXTURE COORDINATE PREDICTION IN MESH COMPRESSION

CROSS-REFERENCE TO RELATED APPLICATION

This application claims priority from U.S. Provisional Application No. 63/404,399, filed on Sep. 7, 2022, the disclosure of which is incorporated herein by reference in its entirety.

FIELD

This disclosure is directed to a set of advanced video coding technologies. More specifically, the present disclosure is directed to texture coordinate prediction in mesh compression.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may be composed of several polygons that describe the surface of a volumetric object. A mesh may be composed of several polygons that describe the surface of a volumetric object. Each polygon may be defined by its vertices in 3D space and the information of how the vertices are connected, referred to as connectivity information. Such mapping is usually described by a set of parametric coordinates, referred to as XYZ coordinates. In some embodiments, vertex attributes, such as colors, normals, etc., could also be associated with the mesh vertices. Attributes could also be associated with the surface of the mesh by exploiting mapping information that parameterizes the mesh with 2D attribute maps. Such mapping is usually described by a set of parametric coordinates, referred to as UV coordinates or texture coordinates, associated with the mesh vertices. 2D attribute maps may be used to store high resolution attribute information such as texture, normals, displacements etc. Such information could be used for various purposes such as texture mapping and shading.

A dynamic mesh sequence may require a large amount of data since it may have a significant amount of information changing over time. Therefore, efficient compression technologies are required to store and transmit such contents.

While mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

SUMMARY

According to embodiments, a method, apparatus, and a non-transitory computer-readable medium stores computer instructions for a process for texture coordinate prediction for mesh compression may be provided.

According to an embodiment, the process may include receiving, for a mesh, a texture coordinate of a first vertex and a texture coordinate of a prediction candidate vertex in a three dimensional (3D) space, the prediction candidate vertex being a co-edge vertex of the first vertex, wherein the first vertex and the co-edge vertex are on opposite sides of two polygon meshes sharing an edge; determining a stretch perpendicular distance associated with the first vertex and the prediction candidate vertex, the stretch perpendicular distance being based on a conversion of the 3D space into a two dimensional (2D) space; and determining a 2D texture coordinate of the first vertex based on the stretch perpendicular distance associated with the first vertex and the prediction candidate vertex. The process may also include determining a residual of a predicted coordinate of the first vertex and an actual 2D coordinate of the first vertex; and compressing the mesh based on entropy coding the residual.

According to an embodiment, the apparatus may include at least one memory configured to store program code; and at least one processor configured to read the program code and operate as instructed by the program code. The program code may include receiving code configured to cause the at least one processor to receive, for a mesh, a texture coordinate of a first vertex and a texture coordinate of a prediction candidate vertex in a three dimensional (3D) space, the prediction candidate vertex being a co-edge vertex of the first vertex, wherein the first vertex and the co-edge vertex are on opposite sides of two polygon meshes sharing an edge; first determining code configured to cause the at least one processor to determine a stretch perpendicular distance associated with the first vertex and the prediction candidate vertex, the stretch perpendicular distance being based on a conversion of the 3D space into a two dimensional (2D) space; and second determining code configured to cause the at least one processor to determine a 2D texture coordinate of the first vertex based on the stretch perpendicular distance associated with the first vertex and the prediction candidate vertex. The program code may include third determining code configured to cause the at least one processor to determine a residual of the predicted coordinate of the first vertex and an actual 2D coordinate of the first vertex; and first compressing code configured to cause the at least one processor to compress the mesh based on entropy coding the residual.

According to an embodiment, non-transitory computer-readable medium storing instructions may include one or more instructions that, when executed by one or more processors of a device for texture coordinate prediction for mesh compression, cause the one or more processors to receive, for a mesh, a texture coordinate of a first vertex and a texture coordinate of a prediction candidate vertex in a three dimensional (3D) space, the prediction candidate vertex being a co-edge vertex of the first vertex, wherein the first vertex and the co-edge vertex are on opposite sides of two polygon meshes sharing an edge; determine a stretch perpendicular distance associated with the first vertex and the prediction candidate vertex, the stretch perpendicular distance being based on a conversion of the 3D space into a two dimensional (2D) space; and determine a 2D texture coordinate of the first vertex based on the stretch perpendicular distance associated with the first vertex and the prediction candidate vertex. The one or more instructions may further cause the one or more processors to determine a residual of a predicted coordinate of the first vertex and an actual 2D coordinate of the first vertex; and compress the mesh based on entropy coding the residual.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

A mesh may include several polygons that describe the surface of a volumetric object. As stated above, mesh geometry information consists of vertex connectivity information, 3D coordinates, and texture coordinates, etc.

According to an aspect of the present disclosure, methods, systems, and non-transitory storage mediums for parallel processing of dynamic mesh compression are provided. Embodiments of the present disclosure may also be applied to static meshes.

Figure 1:
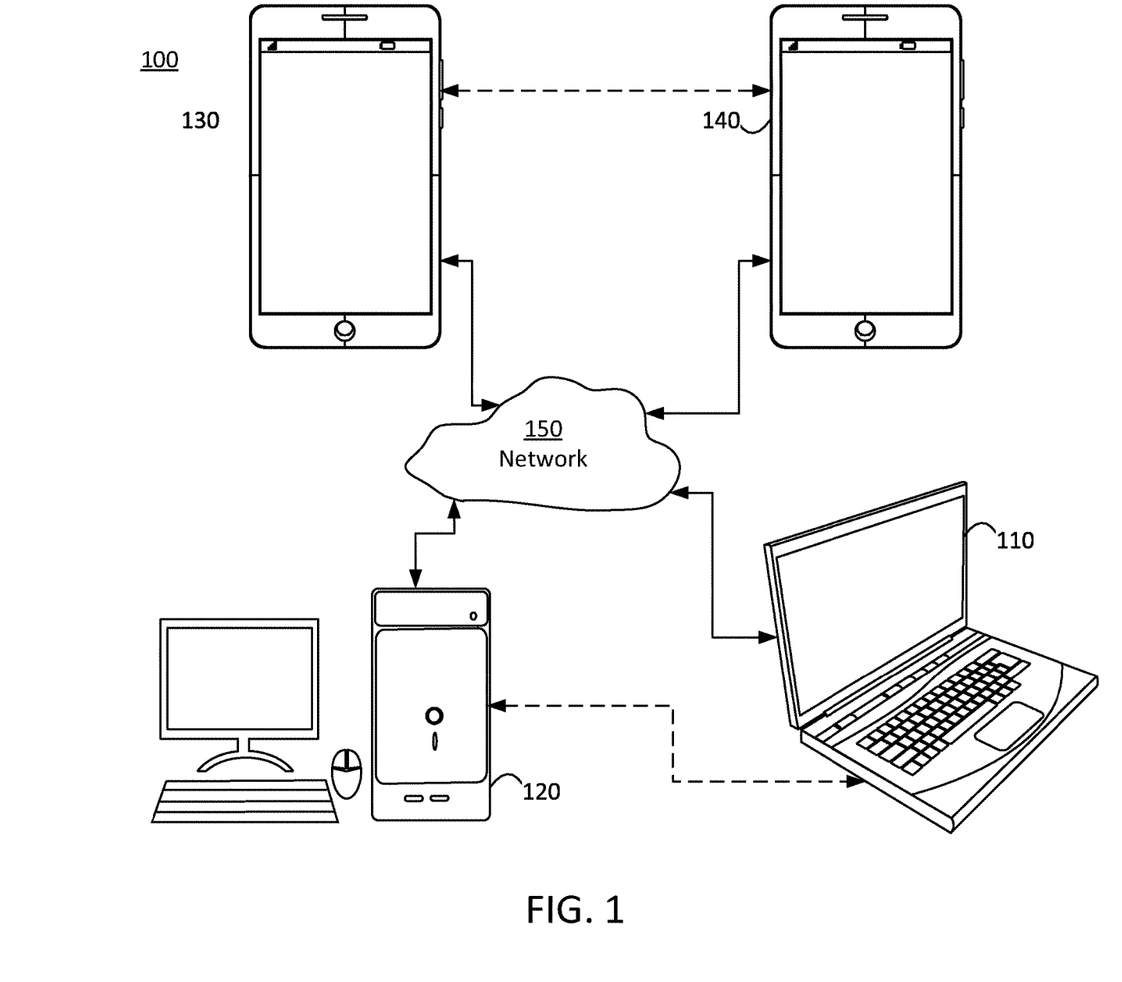
FIG. 1 is a schematic illustration of a simplified block diagram of a communication system, in accordance with embodiments of the present disclosure.
Figure 2:
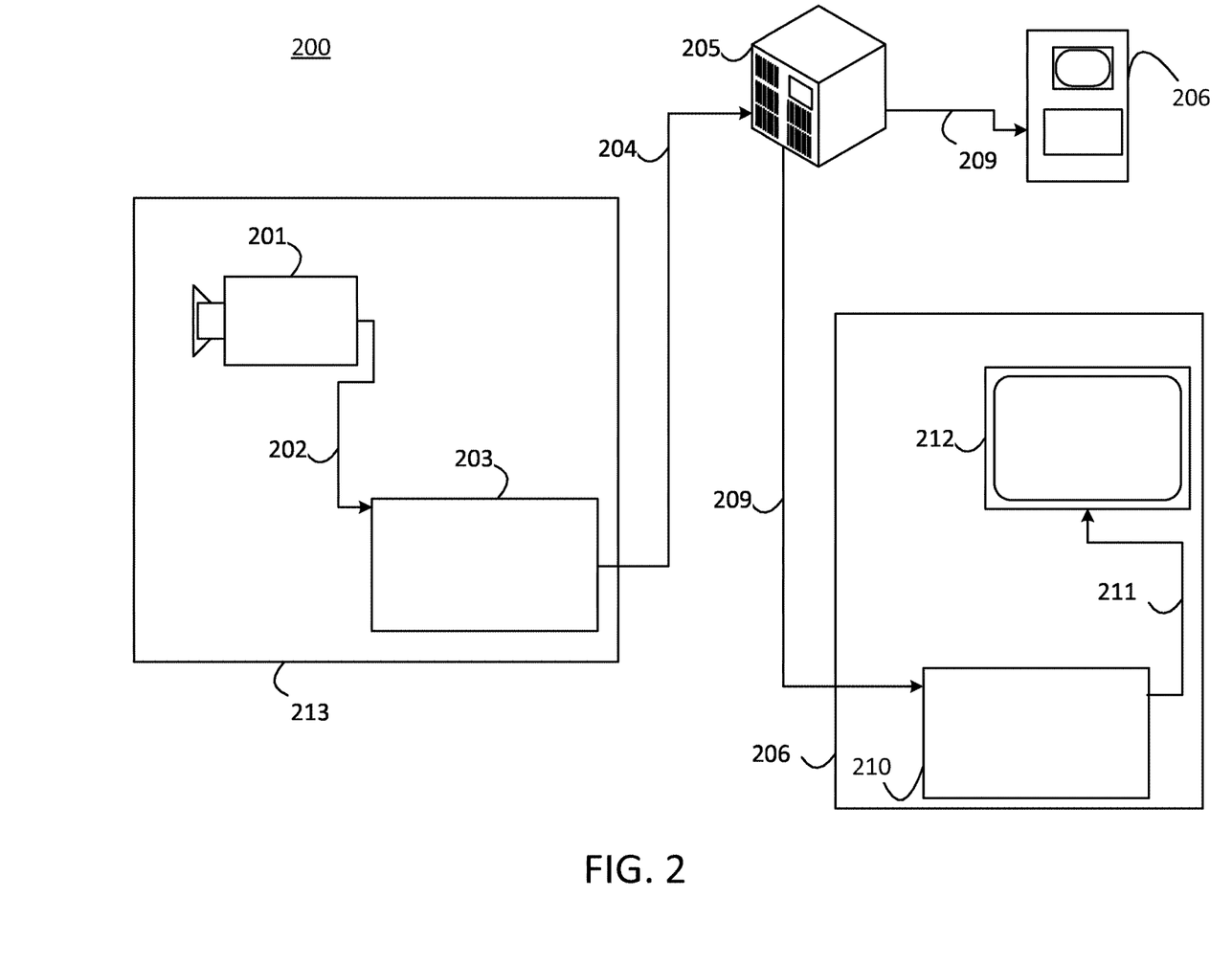
FIG. 2 is a schematic illustration of a simplified block diagram of a streaming system, in accordance with embodiments of the present disclosure.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards.

Figure 3:
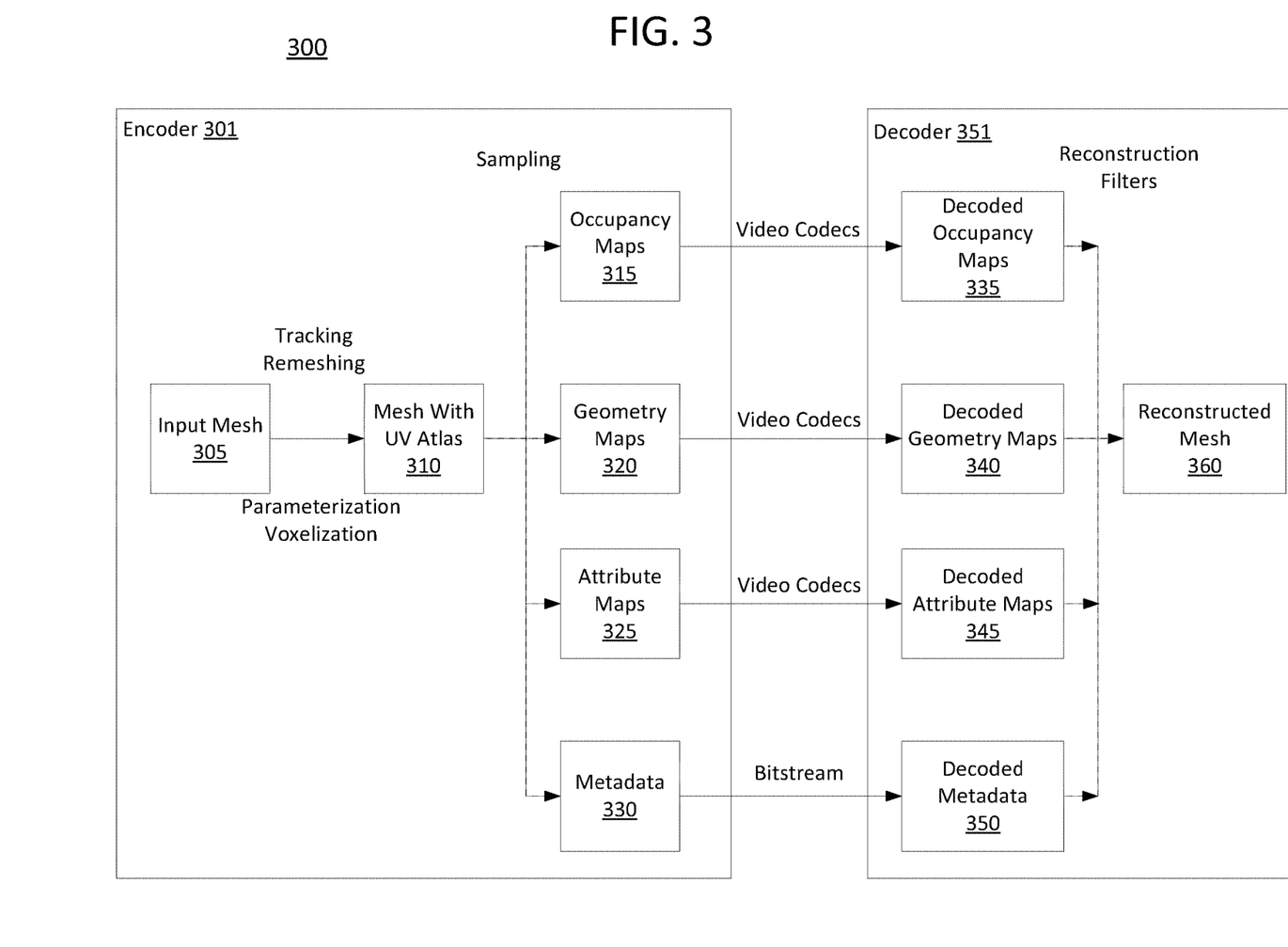
FIG. 3 is a schematic illustration of a simplified block diagram of a video encoder and decoder, in accordance with embodiments of the present disclosure.

FIG. 3 is an exemplary diagram of framework 300 for dynamic mesh compression and mesh reconstruction using encoders and decoders.

As seen in FIG. 3, framework 300 may include an encoder 301 and a decoder 351. The encoder 301 may include one or more input mesh 305, one or more mesh with UV atlas 310, occupancy maps 315, geometry maps 320, attribute maps 325, and metadata 330. The decoder 351 may include decoded occupancy maps 335, decoded geometry maps 340, decoded attribute maps 345, decoded metadata 350, and reconstructed mesh 360.

According to an aspect of the present disclosure, the input mesh 305 may include one or more frames, and each of the one or more frames may be preprocessed by a series of operations and used to generate the mesh with UV atlas 310. As an example, the preprocessing operations may include and may not be limited to tracking, parameterization, remeshing, voxelization, etc. In some embodiments, the preprocessing operations may be performed only on the encoder side and not the decoder side.

The mesh with UV atlas 310 may be a 2D mesh. The 2D mesh with UV atlas may be a mesh in which each vertex of the mesh may be associated with UV coordinates on a 2D atlas. The mesh with the UV atlas 310 may be processed and converted into a plurality of maps based on sampling. As an example, the UV atlas 310 may be processed and converted into occupancy maps, geometry maps, and attribute maps based on sampling the 2D mesh with UV atlas. The generated occupancy maps 335, geometry maps 340, and attribute maps 345 may be encoded using appropriate codecs (e.g., HVEC, VVC, AV1, etc.) and transmitted to a decoder. In some embodiments, metadata (e.g., connectivity information etc.) may also be transmitted to the decoder.

According to an aspect, the decoder 351 may receive the encoded occupancy maps, geometry maps, and attribute maps from an encoder. The decoder 351 may use appropriate techniques and methods, in addition to embodiments described herein, to decode the occupancy maps, geometry maps, and attribute maps. In an embodiment, decoder 351 may generate decoded occupancy maps 335, decoded geometry maps 340, decoded attribute maps 345, and decoded metadata 350. The input mesh 305 may be reconstructed into reconstructed mesh 360 based on the decoded occupancy maps 335, decoded geometry maps 340, decoded attribute maps 345, and decoded metadata 350 using one or more reconstruction filters and techniques. In some embodiments, the metadata 330 may be directly transmitted to decoder 351 and the decoder 351 may use the metadata to generate the reconstructed mesh 360 based on the decoded occupancy maps 335, decoded geometry maps 340, and decoded attribute maps 345. Post-filtering techniques, including but not limited to remeshing, parameterization, tracking, voxelization, etc., may also be applied on the reconstructed mesh 360.

The input meshes with 2D UV atlases may have vertices, where each vertex of the mesh may have an associated UV coordinates on the 2D atlas. The occupancy, geometry, and attribute maps may be generated by sampling one or more points/positions on the UV atlas. Each sample position, if it is inside a polygon defined by the mesh vertices, may be occupied or unoccupied. For each occupied sample, one can calculate its corresponding 3D geometry coordinates and attributes by interpolating from the associated polygon vertices.

According to an aspect of the present disclosure, the sampling rate may be consistent over the whole 2D atlas. In some embodiments, the sampling rate for u and v axes may be different, making anisotropic remeshing possible. In some embodiments, the whole 2D atlas may be divided into multiple regions, such as slices or tiles, and each such region may have a different sampling rate.

According to an aspect of the present disclosure, the sampling rate for each region (or the entire 2D atlas) may be signaled in a high-level syntax, including but not limited to sequence header, frame header, slice header, etc. In some embodiments, sampling rate for each region (or the entire 2D atlas) may be chosen from a pre-established set of rates that have been assumed by both the encoder and decoder. Because the pre-established set of rates that are known by both the encoder and decoder, signaling of one particular sampling rate would require only signaling the index in the pre-established rate set. An example of such a pre-established set may be every 2 pixels, every 4 pixels, every 8 pixels, etc. In some embodiments, the sampling rate for each region (or the entire 2D atlas) of a mesh frame may be predicted from a pre-established rate set, from a previously used sampling rate in other already coded regions of the same frame, or from a previously used sampling rate in other already coded mesh frames.

In some embodiments, the sampling rate for each region (or the entire 2D atlas) may be based on some characteristic of each region (or the entire 2D atlas). As an example, the sample rate can be based on activity—for a rich-textured region (or the entire 2D atlas), or a region (or the entire 2D atlas) with high activity, the sample rate could be set higher. As another example, for a smooth region (or the entire 2D atlas), or a region (or the entire 2D atlas with low activity, the sample rate could be set lower.

In some embodiments, the sampling rate for each region (or the entire 2D atlas) of a mesh frame may be signaled in a way that combination of prediction and direct signaling may be allowed. The syntax may be structured to indicate if a sampling rate will be predicted or directly signaled. When predicted, which of the predictor-sampling rate to be used may be further signaled. When directly signaled, the syntax to represent the value of the rate may be signaled.

In the present disclosure, exemplary polygons such as triangle meshes are considered in more detail. A triangle mesh is a type of polygon mesh, comprising a set of triangles that are connected by their common edges or corners. Methods disclosed in this disclosure may be extended to other polygonal meshes such as quadrilateral or pentagon meshes, etc.

In related art, similarity of triangles from 3D coordinates to texture coordinates is employed by Draco method to compress texture coordinates. As in FIG. 4, points C, N, and P are three vertices of a triangle in the texture plane (e.g., 2D plane mapping texture), where C is the next vertex to be encoded. 3D coordinates may include properties of the 3D mesh in three-dimensions and texture coordinates may include properties of the respective 3D coordinates in two-dimensions.

Figure 4:
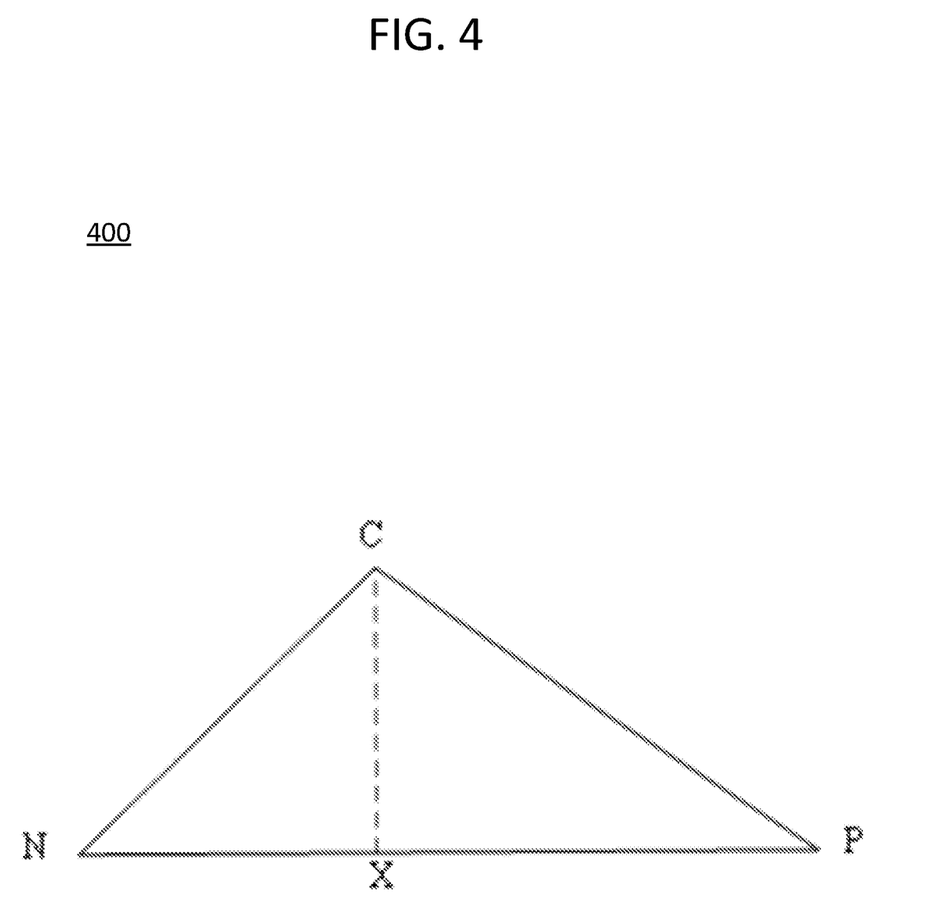
FIG. 4 is an exemplary illustration of texture coordinate prediction in related art, in accordance with embodiments of the present disclosure.

The Draco method texture coordinate compression may include:

Step 1: If either N or P is after C in the encoding order list, compress the texture coordinate of C with the delta coding.

Step 2: If the coding orders of both N and P are before C, use the prediction coding method to encode C: CX is perpendicular to NP. Calculate X and $\overrightarrow{XC}$, and then get two candidate values, i.e., X+ $\overrightarrow{XC}$, X− $\overrightarrow{XC}$, as the potential predicted coordinates.

Step 3: Calculate the Euclidean distances between C and the two candidates, and choose the smaller one as the predicted coordinate of C. A flag will be used to mark which one is the predicted coordinate.

Step 4: Calculate the residual between the original coordinate and the predicted coordinate. Compress the residual and flag by using the entropy coding.

According to an embodiment of the present disclosure, a better way to capture the projection from the 3D space to the texture plane is to consider the stretch of distance after projection. In this disclosure, methods and systems of texture coordinate prediction in mesh compression using stretch of distance after projection.

A person of skill in the art will know that the proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

In the present disclosure, methods and systems are proposed for texture coordinate prediction in mesh compression. A person of skill in the art will know that they can be applied individually or by any form of combinations. It should be also noted that the methods can be applied to not only dynamic meshes, but also static meshes, where there is only one frame of the mesh, or the mesh content does not change over time. Further, the disclosed methods and systems are not limited to texture coordinate compression. They can also be applied to, for example, 3D coordinate compression.

As stated above, the present disclosure uses triangle meshes for describing the disclosure in detail but a person of skill in the art will know that mesh polygons of any shape may be used.

Triangles in a triangle mesh may be ordered. The order of triangles may be based on a specific order (e.g., the traversal in the Edgebreaker algorithm, etc.). Vertices may be ordered. The order of vertices may be based on a specific order (e.g., the traversal in the Edgebreaker algorithm, etc.). The orders of triangles and vertices may be based on the same scheme, such as the traversal, or different schemes.

Figure 5A:
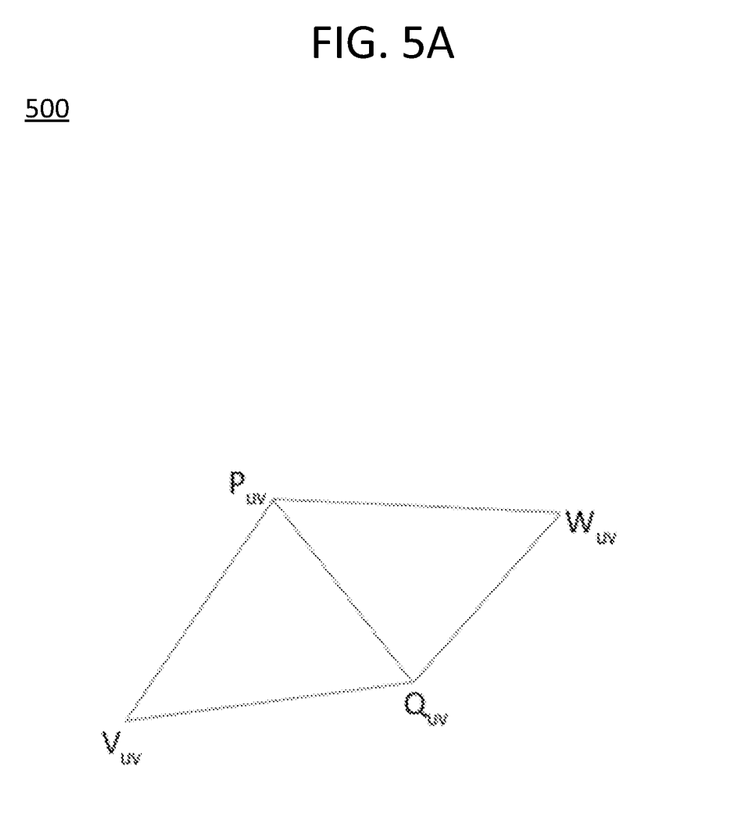
FIG. 5A is an illustration of an exemplary co-edge and candidate prediction vertex, in accordance with embodiments of the present disclosure.

As seen in FIG. 5A, mesh 500 may include two triangle meshes with a co-edge and prediction candidate vertex.

As seen in FIG. 5A, illustrates an example of a co-edge vertex. For a vertex V, if there is another vertex W, such that V and W are the opposite vertices of two triangles sharing an edge in the texture plane, W is a co-edge vertex of V. During texture coordinate compression, if texture coordinates of W, and of two vertices of the common edge (which are vertices P and Q in FIG. 5A) are already coded, W is a texture coordinate prediction candidate of V.

According to an embodiment, encoding the texture coordinates of V, the stretch of perpendicular distance after 3D space to texture plane projection may be calculated and used to predict texture coordinates accordingly.

Figure 5B:
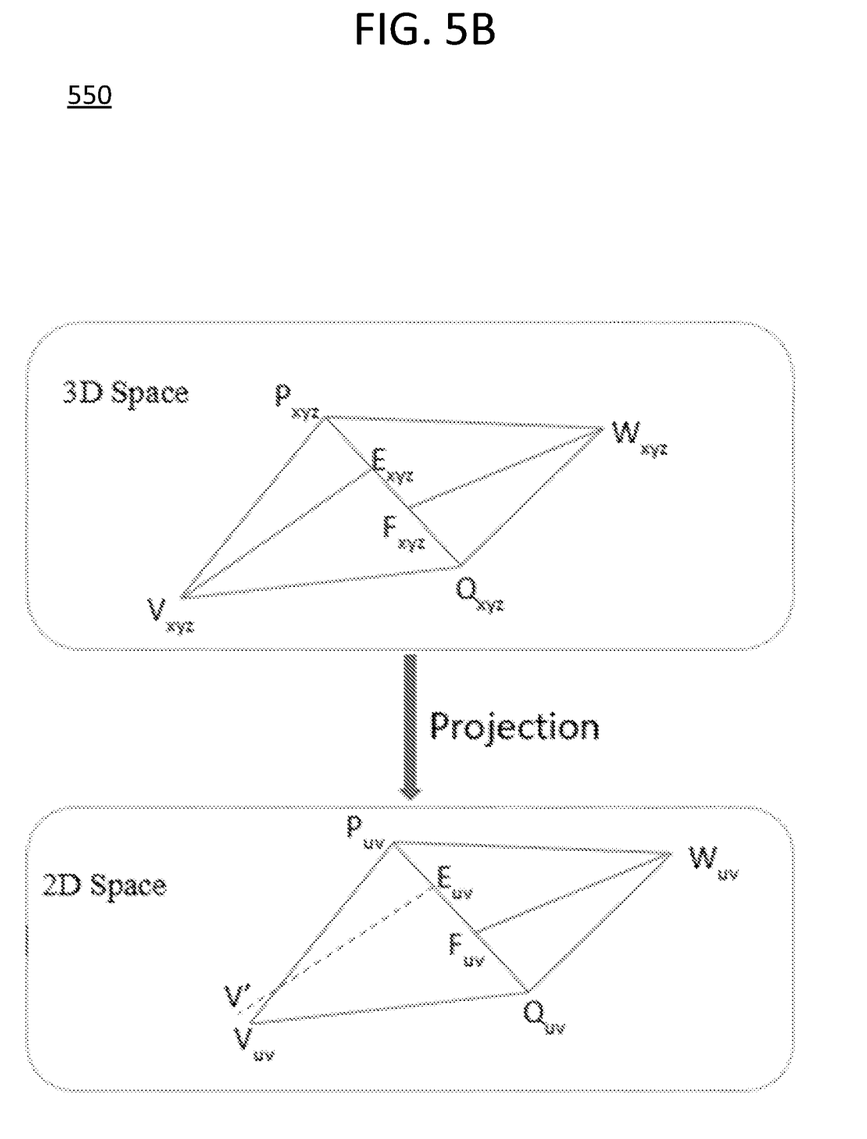
FIG. 5B is an illustration for texture coordinate prediction for mesh compression, in accordance with embodiments of the present disclosure.

FIG. 5B illustrates texture coordinate prediction for mesh compression from 3D coordinates in 3D space to texture coordinates in 2D space.

As seen in FIG. 5B, diagram 550 includes $V_{xyz}$ and $V_{uv}$ denote the 3D coordinates and texture coordinates of V, respectively. As seen in diagram 550, W is a texture coordinate compression prediction candidate of V.

In an embodiment, as seen in diagram 550, perpendicular lines from $V_{xyz}$ and $W_{xyz}$ to the edge $P_{xyz}Q_{xyz}$ may be drawn in the 3D space. The intersection vertices are $E_{xyz}$ and $F_{xyz}$, as in diagram 550.

In an embodiment, perpendicular prediction may be used.

In the texture plane, the vertex $E_{uv}$ may be determined, where $E_{uv}$ is on the edge $P_{uv}Q_{uv}$, or the extended line of $P_{uv}Q_{uv}$, and maintains the ratio between lengths $|PE|$ and $|EQ|$ in the 3D space, that is, $|P_{xyz}E_{xyz}|/|E_{xyz}Q_{xyz}|=|P_{uv}E_{uv}|/|E_{uv}Q_{uv}|$. Similarly the vertex $F_{uv}$ in the texture plane may be determined.

Then in the texture plane, from the vertex $E_{uv}$, a perpendicular line may be drawn to the edge $P_{uv}Q_{uv}$, and a vertex V' may be selected on the perpendicular line, such that the length $|V'E_{uv}|=|V_{xyz}E_{xyz}|*|W_{uv}F_{uv}|/|W_{xyz}F_{xyz}|$.

Unlike the texture coordinate compression in related art, in the present disclosure, V' always resides in the opposite side of the vertex $W_{uv}$ along the line $P_{uv}Q_{uv}$. Thus in the present disclosure, there is no need to flag which side the prediction vertex V' belongs to.

Finally, a residual between the original coordinate $V_{uv}$ and the predicted coordinate V' may be calculated. The residual may be compressed by using an entropy coding. The entropy coding may be a fixed length coding, or a variable length coding, such as the Exp-Golomb coding, arithmetic coding, Huffman coding, etc.

In an embodiment, parallel prediction may be used.

An embodiment of the present disclosure includes using parallel lines in the texture plane. From the vertex $E_{uv}$, a line parallel to the line $W_{uv}F_{uv}$ may be drawn, and a vertex V' may be selected on the parallel line, such that the length $|V'E_{uv}|=|V_{xyz}E_{xyz}|*|W_{uv}F_{uv}|/|W_{xyz}F_{xyz}|$.

Then, the residual between the original coordinate $V_{uv}$ and the predicted coordinate V' may be calculated and compressed using entropy coding. The entropy coding may be a fixed length coding, or a variable length coding, such as the Exp-Golomb coding, arithmetic coding, Huffman coding, etc.

In an embodiment, multiple predictors may be used for texture prediction.

When encoding the texture coordinates of V, in some embodiments, if there are more than one texture coordinate compression prediction candidates available, then an average of predicated values may be used. Assuming there are M predicated texture coordinates $V_1, V_2, \ldots, V_M$ for the vertex V, where M is a positive integer, the average V' is computed based on $V'=(V_1+V_2+ \ldots +V_M)/M$.

The residual between the original coordinate $V_{uv}$ and the average V' may be calculated and compressed using an entropy coding. The entropy coding may be a fixed length coding, or a variable length coding, such as the Exp-Golomb coding, arithmetic coding, Huffman coding, etc.

In an embodiment, constrained predictors may be used for texture prediction.

In an embodiment, an upper limit L may be set indicating how many texture coordinate compression prediction candidates may be considered, where L may a positive integer. In this embodiment, for a vertex V, if there are more than L texture coordinate compression prediction candidates, then only the first L prediction candidates and their associated predicted values, $V_1, V_2, \ldots, V_L$ are considered, and $V'=(V_1+V_2+ \ldots +V_L)/L$.

The residual between the original coordinate $V_{uv}$ and the average V' may be calculated and compressed using an entropy coding. The entropy coding may be a fixed length coding, or a variable length coding, such as the Exp-Golomb coding, arithmetic coding, Huffman coding, etc.

Figure 6:
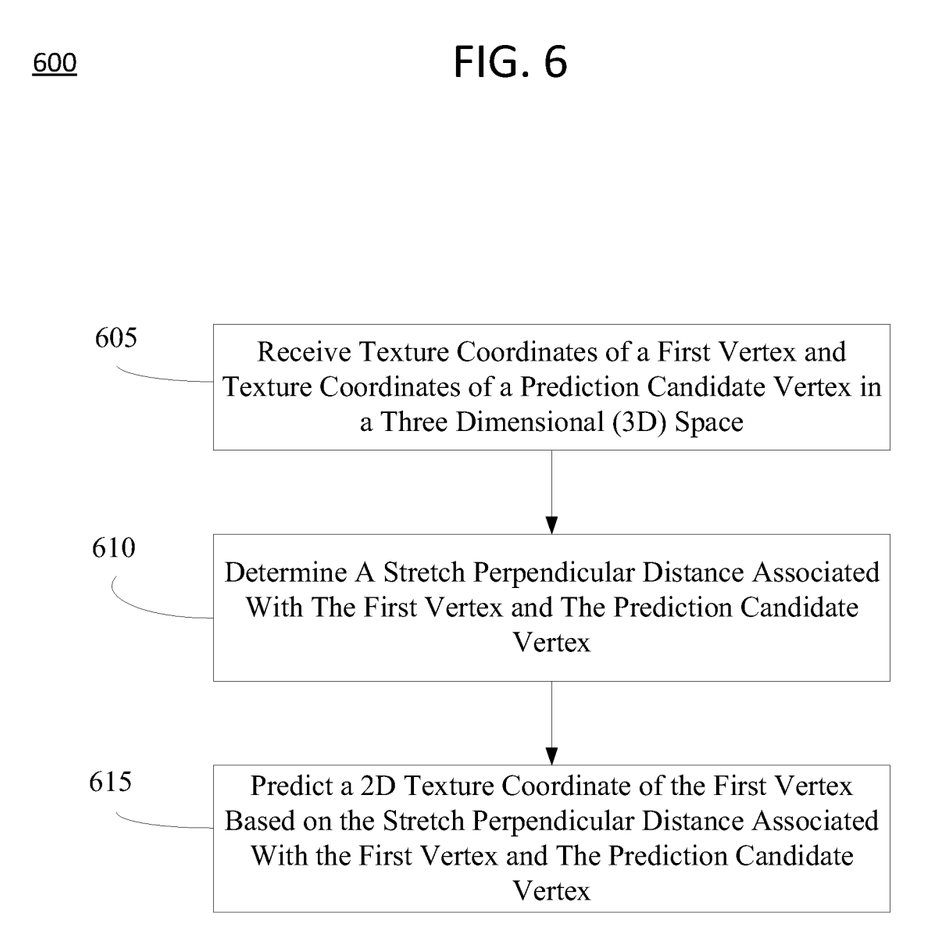
FIG. 6 is an exemplary flow diagram illustrating a process for generating temporally correlated UV atlases, in accordance with embodiments of the present disclosure.

FIG. 6 is a flow diagram illustrating a process 600 for texture coordinate prediction for mesh compression.

At operation 605, for a mesh, a coordinate of a first vertex and a coordinate of a prediction candidate vertex in a three dimensional (3D) space may be received. The prediction candidate vertex may be a co-edge vertex of the first vertex and the first vertex and the co-edge vertex may be on opposite sides of two polygon meshes sharing an edge. As an example, as seen in diagram 550, the 3D coordinates for $V_{xyz}$ and $W_{xyz}$ may be received.

In some embodiments determining the stretch perpendicular distance may include determining, in the 3D space, a first perpendicular line from the first vertex to the shared edge, the first perpendicular line dividing the shared edge in a first ratio; determining, in the 2D space, a first intersection point dividing the shared edge in the first ratio; determining, in the 3D space, a second perpendicular line from the prediction candidate vertex to the shared edge, the second perpendicular line dividing the shared edge in a second ratio; and determining, in the 2D space, a second intersection point dividing the shared edge in the second ratio.

At operation 610, a stretch perpendicular distance associated with the first vertex and the prediction candidate vertex may be received. In some embodiments, the stretch perpendicular distance may be based on a conversion of the 3D space into a two dimensional (2D) space. As an example, $V_{xyz}E_{xyz}$ and $W_{xyz}F_{xyz}$ may be used to determine the stretch perpendicular distance.

At operation 615, a 2D texture coordinate of the first vertex based on the stretch perpendicular distance associated with the first vertex and the prediction candidate vertex. As an example, $V_{uv}$ may be determined based on $V_{xyz}E_{xyz}$ and $W_{xyz}F_{xyz}$.

In some embodiments, determining the 2D texture coordinate of the first vertex may include determining, in the 2D space, a predicted coordinate of the first vertex on a predicted line, the predicted line being a line that is perpendicular to the shared edge and passing through the first intersection point, wherein the predicted coordinate of the first vertex on the predicted line is based on the second perpendicular line and the second intersection point.

In some embodiments, determining the 2D texture coordinate of the first vertex may include determining, in the 2D space, a predicted coordinate of the first vertex on a parallel line, the parallel line being a line that is parallel to the second perpendicular line and passing through the first intersection point, wherein the predicted coordinate of the first vertex on the parallel line is based on a distance relationship between the second perpendicular line and the second intersection point.

In some embodiments, the coordinate of the prediction candidate vertex may include coordinates of more than one prediction candidate vertices, and thus, the 2D texture coordinate of the first vertex may be based on a respective stretch perpendicular distance associated with the first vertex and the respective prediction candidate vertex among the more than one prediction candidate vertices. In some embodiments, a number of prediction candidate vertices included in the more than one prediction candidate vertices may be less than a first threshold.

In some embodiments, process 600 may include operation 620 to encode the predicted coordinates of the first vertex of the mesh.

In some embodiments, process 600 may also include operations 620 and 625.

At operation 620, a residual of a predicted coordinate of the first vertex and an actual 2D coordinate of the first vertex may be determined. As an example, the residual between the original coordinate $V_{uv}$ and the predicted coordinate V' may be determined.

At operation 625, the mesh may be compressed based on entropy coding the residual. As an example, the residual between the original coordinate $V_{uv}$ and the predicted coordinate V' may be compressed using entropy coding. The entropy coding may be a fixed length coding, or a variable length coding, such as the Exp-Golomb coding, arithmetic coding, Huffman coding, etc.

The techniques, described above, can be implemented as computer software using computer-readable instructions and physically stored in one or more computer-readable media. For example, FIG. 7 shows a computer system 700 suitable for implementing certain embodiments of the disclosure.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
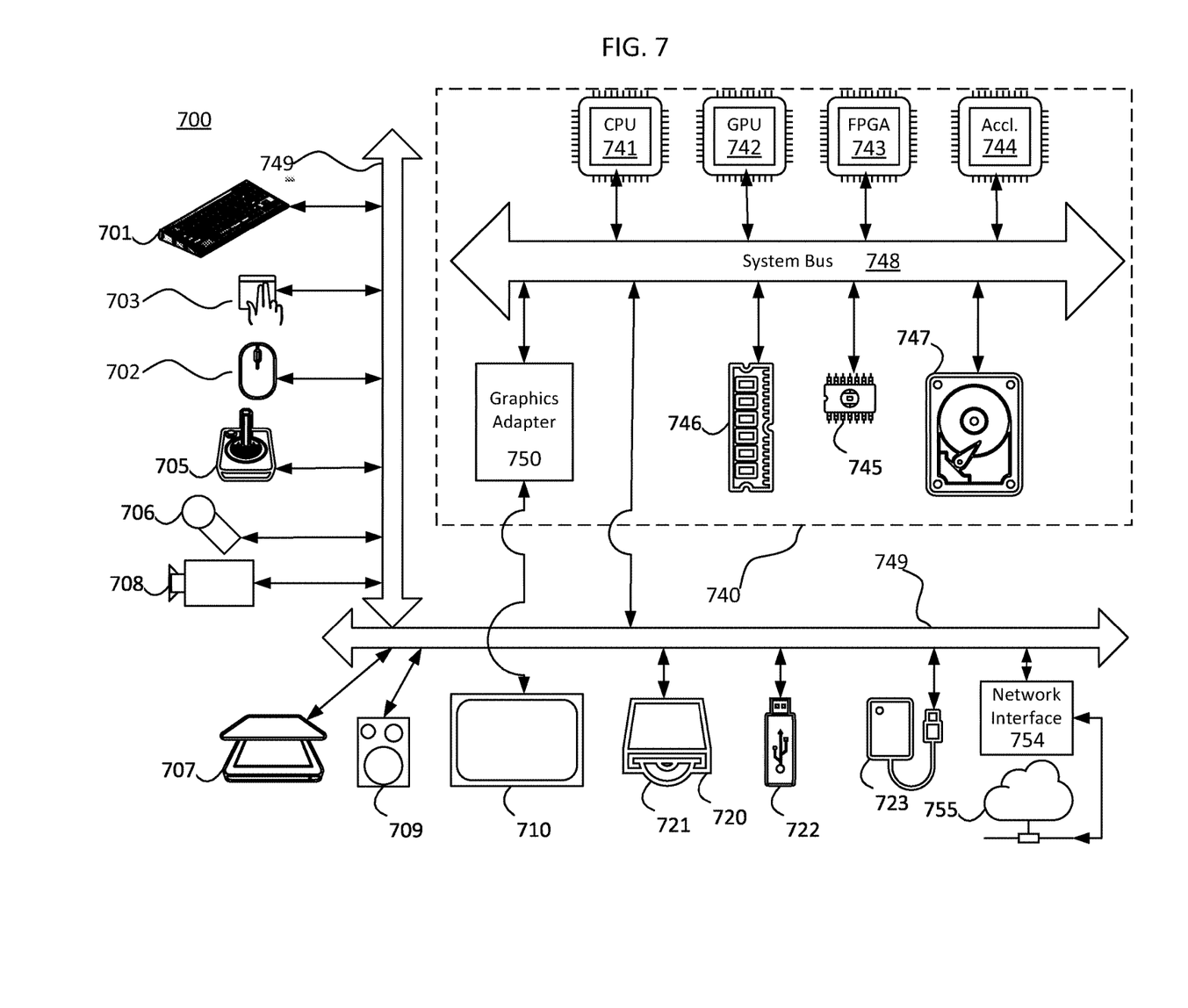
FIG. 7 is a diagram of a computer system suitable for implementing embodiments.

The components shown in FIG. 7 for computer system 700 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data glove, or joystick 705, but there can also be tactile feedback devices that do not serve as input devices). For example, such devices may be audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 749 (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 755. Certain protocols and protocol stacks can be used on each of those networks and network interfaces as described above.

Aforementioned human interface devices, human-accessible storage devices, and network interfaces 754 can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like. A graphics adapter 750 may be included in the core 740.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for texture coordinate prediction for mesh compression, the method being executed by at least one processor, the method comprising:
    receiving, for a mesh, a coordinate of a first vertex and a coordinate of a prediction candidate vertex in a three dimensional (3D) space, the first vertex and the prediction candidate vertex being on opposite sides of two polygon meshes sharing an edge in a texture plane;
    determining a stretch perpendicular distance associated with the first vertex and the prediction candidate vertex, the stretch perpendicular distance being based on a conversion of the 3D space into a two dimensional (2D) space;
    predicting a texture coordinate of the first vertex based on the stretch perpendicular distance associated with the first vertex and the prediction candidate vertex; and
    encoding the predicted texture coordinate of the first vertex of the mesh.

2. The method of claim 1, wherein determining the stretch perpendicular distance comprises:

determining, in the 3D space, a first perpendicular line from the first vertex to the shared edge, the first perpendicular line dividing the shared edge in a first ratio;

determining, in the 2D space, a first intersection point dividing the shared edge in the first ratio;

determining, in the 3D space, a second perpendicular line from the prediction candidate vertex to the shared edge, the second perpendicular line dividing the shared edge in a second ratio; and determining, in the 2D space, a second intersection point dividing the shared edge in the second ratio.

3. The method of claim 2, wherein determining the predicted texture coordinate of the first vertex comprises:

determining, in the 2D space, a predicted coordinate of the first vertex on a predicted line, the predicted line being a line that is perpendicular to the shared edge and passing through the first intersection point, wherein the predicted coordinate of the first vertex on the predicted line is based on the second perpendicular line and the second intersection point.

4. The method of claim 3, wherein the method further comprises:

determining a residual of the predicted coordinate of the first vertex and an actual 2D coordinate of the first vertex; and compressing the mesh based on entropy coding the residual.

5. The method of claim 2, wherein determining the predicted texture coordinate of the first vertex comprises:

determining, in the 2D space, a predicted coordinate of the first vertex on a parallel line, the parallel line being a line that is parallel to the second perpendicular line and passing through the first intersection point, wherein the predicted coordinate of the first vertex on the parallel line is based on a distance relationship between the second perpendicular line and the second intersection point.

6. The method of claim 5, wherein the method further comprises:

determining a residual of the predicted coordinate of the first vertex and an actual 2D coordinate of the first vertex; and compressing the mesh based on entropy coding the residual.

7. The method of claim 1, wherein the coordinate of the prediction candidate vertex comprises coordinates of more than one prediction candidate vertices, and wherein the predicted texture coordinate of the first vertex is based on a respective stretch perpendicular distance associated with the first vertex and a respective prediction candidate vertex among the more than one prediction candidate vertices.

8. The method of claim 7, wherein a number of prediction candidate vertices included in the more than one prediction candidate vertices is less than a first threshold.

9. An apparatus for texture coordinate prediction for mesh compression, the apparatus comprising:

at least one memory configured to store program code; and at least one processor configured to read the program code and operate as instructed by the program code, the program code including:

receiving code configured to cause the at least one processor to receive, for a mesh, a coordinate of a first vertex and a coordinate of a prediction candidate vertex in a three dimensional (3D) space, the first vertex and the prediction candidate vertex being on opposite sides of two polygon meshes sharing an edge in a texture plane;

first determining code configured to cause the at least one processor to determine a stretch perpendicular distance associated with the first vertex and the prediction candidate vertex, the stretch perpendicular distance being based on a conversion of the 3D space into a two dimensional (2D) space;

second determining code configured to cause the at least one processor to predict a texture coordinate of the first vertex based on the stretch perpendicular distance associated with the first vertex and the prediction candidate vertex; and encoding code configured to cause the at least one processor to encode the predicted texture coordinate of the first vertex of the mesh.

10. The apparatus of claim 9, wherein the first determining code comprises:

third determining code configured to cause the at least one processor to determine, in the 3D space, a first perpendicular line from the first vertex to the shared edge, the first perpendicular line dividing the shared edge in a first ratio;

fourth determining code configured to cause the at least one processor to determine, in the 2D space, a first intersection point dividing the shared edge in the first ratio;

fifth determining code configured to cause the at least one processor to determine, in the 3D space, a second perpendicular line from the prediction candidate vertex to the shared edge, the second perpendicular line dividing the shared edge in a second ratio; and sixth determining code configured to cause the at least one processor to determine, in the 2D space, a second intersection point dividing the shared edge in the second ratio.

11. The apparatus of claim 10, wherein the second determining code comprises:

seventh determining code configured to cause the at least one processor to determine, in the 2D space, a predicted coordinate of the first vertex on a predicted line, the predicted line being a line that is perpendicular to the shared edge and passing through the first intersection point, wherein the predicted coordinate of the first vertex on the predicted line is based on the second perpendicular line and the second intersection point.

12. The apparatus of claim 11, wherein the program code further comprises:

eight determining code configured to cause the at least one processor to determine a residual of the predicted coordinate of the first vertex and an actual 2D coordinate of the first vertex; and first compressing code configured to cause the at least one processor to compress the mesh based on entropy coding the residual.

13. The apparatus of claim 10, wherein the second determining code comprises:

ninth determining code configured to cause the at least one processor to determine, in the 2D space, a predicted coordinate of the first vertex on a parallel line, the parallel line being a line that is parallel to the second perpendicular line and passing through the first intersection point, wherein the predicted coordinate of the first vertex on the parallel line is based on a distance relationship between the second perpendicular line and the second intersection point.

14. The apparatus of claim 13, wherein the program code further comprises:
tenth determining code configured to cause the at least one processor to determine a residual of the predicted coordinate of the first vertex and an actual 2D coordinate of the first vertex; and
second compressing code configured to cause the at least one processor to compression the mesh based on entropy coding the residual.

15. A non-transitory computer-readable medium storing instructions, the instructions comprising: one or more instructions that, when executed by one or more processors of a device for texture coordinate prediction for mesh compression, cause the one or more processors to:
receive, for a mesh, a coordinate of a first vertex and a coordinate of a prediction candidate vertex in a three dimensional (3D) space, the first vertex and the prediction candidate vertex being on opposite sides of two polygon meshes sharing an edge in a texture plane;
determine a stretch perpendicular distance associated with the first vertex and the prediction candidate vertex, the stretch perpendicular distance being based on a conversion of the 3D space into a two dimensional (2D) space;
predicting a texture coordinate of the first vertex based on the stretch perpendicular distance associated with the first vertex and the prediction candidate vertex; and
encode the predicted texture coordinate of the first vertex of the mesh.

16. The non-transitory computer-readable medium of claim 15, wherein determining the stretch perpendicular distance comprises:
determining, in the 3D space, a first perpendicular line from the first vertex to the shared edge, the first perpendicular line dividing the shared edge in a first ratio;
determining, in the 2D space, a first intersection point dividing the shared edge in the first ratio;
determining, in the 3D space, a second perpendicular line from the prediction candidate vertex to the shared edge, the second perpendicular line dividing the shared edge in a second ratio; and
determining, in the 2D space, a second intersection point dividing the shared edge in the second ratio.

17. The non-transitory computer-readable medium of claim 16, wherein determining the predicted texture coordinate of the first vertex comprises:
determining, in the 2D space, a predicted coordinate of the first vertex on a predicted line, the predicted line being a line that is perpendicular to the shared edge and passing through the first intersection point, wherein the predicted coordinate of the first vertex on the predicted line is based on the second perpendicular line and the second intersection point.

18. The non-transitory computer-readable medium of claim 17, wherein the instructions further cause the one or more processors to:
determine a residual of the predicted coordinate of the first vertex and an actual 2D coordinate of the first vertex; and
compress the mesh based on entropy coding the residual.

19. The non-transitory computer-readable medium of claim 16, wherein determining the predicted texture coordinate of the first vertex comprises:
determining, in the 2D space, a predicted coordinate of the first vertex on a parallel line, the parallel line being a line that is parallel to the second perpendicular line and passing through the first intersection point, wherein the predicted coordinate of the first vertex on the parallel line is based on a distance relationship between the second perpendicular line and the second intersection point.

20. The non-transitory computer-readable medium of claim 19, wherein the instructions further cause the one or more processors to:
determine a residual of the predicted coordinate of the first vertex and an actual 2D coordinate of the first vertex; and
compress the mesh based on entropy coding the residual.

* * * * *